US009208249B2

(12) United States Patent
Crockett et al.

(10) Patent No.: US 9,208,249 B2
(45) Date of Patent: Dec. 8, 2015

(54) PROFILER FOR PAGE RENDERING

(75) Inventors: Sterling J. Crockett, Bothell, WA (US); Adri Verlaan, Kirkland, WA (US); Timothy P. McConnell, Kirkland, WA (US); Frederico A. Mameri, Seattle, WA (US); William J. Griffin, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1115 days.

(21) Appl. No.: 12/569,928

(22) Filed: Sep. 30, 2009

(65) Prior Publication Data

US 2011/0078555 A1 Mar. 31, 2011

(51) Int. Cl.

| | |
|---|---|
| ***G06F 17/00*** | (2006.01) |
| ***G06F 17/30*** | (2006.01) |
| *G06F 17/28* | (2006.01) |

(52) U.S. Cl.

CPC ...... *G06F 17/30902* (2013.01); *G06F 17/2827* (2013.01)

(58) Field of Classification Search

CPC ...................... G06F 17/30902; G06F 17/2827
USPC .................................. 715/234, 235; 709/203
See application file for complete search history.

(56) References Cited

U.S. PATENT DOCUMENTS

| | | | | |
|---|---|---|---|---|
| 6,792,460 | B2 | 9/2004 | Oulu et al. | 709/224 |
| 7,231,606 | B2 | 6/2007 | Miller et al. | 715/738 |
| 7,983,961 | B1 * | 7/2011 | Chang et al. | 705/26.7 |
| 2002/0099818 | A1 | 7/2002 | Russell et al. | 709/224 |
| 2002/0161803 | A1 * | 10/2002 | Shelton | 707/528 |
| 2004/0098486 | A1 * | 5/2004 | Gu et al. | 709/228 |
| 2004/0128618 | A1 * | 7/2004 | Datta | 715/513 |
| 2005/0172076 | A1 * | 8/2005 | Olson et al. | 711/122 |
| 2006/0150168 | A1 * | 7/2006 | Mitchell et al. | 717/156 |
| 2008/0010056 | A1 * | 1/2008 | Zhou et al. | 704/8 |
| 2008/0098300 | A1 * | 4/2008 | Corrales et al. | 715/243 |
| 2008/0228863 | A1 | 9/2008 | Mackey | 709/203 |
| 2008/0235671 | A1 | 9/2008 | Kellogg et al. | 717/139 |
| 2008/0307396 | A1 * | 12/2008 | Broman et al. | 717/130 |
| 2009/0089629 | A1 | 4/2009 | Hawkins | 714/100 |
| 2009/0100154 | A1 | 4/2009 | Stevenson et al. | 709/220 |
| 2009/0284764 | A1 * | 11/2009 | Haikin | 358/1.9 |
| 2009/0300267 | A1 * | 12/2009 | Schneider | 711/100 |
| 2010/0011341 | A1 * | 1/2010 | Baierl et al. | 717/110 |

(Continued)

OTHER PUBLICATIONS

Using Page Speed, Published Date: Jul. 22, 2009, http://code.google.com/speed/page-speed/docs/using.html#activities.

(Continued)

*Primary Examiner* — Stephen Hong
*Assistant Examiner* — Marshon Robinson
(74) *Attorney, Agent, or Firm* — Danielle Johnston-Holmes; Tom Wong; Micky Minhas

(57) ABSTRACT

Profiling may be provided. First, scripts may be inserted into a first page to create a modified page and the modified page may be requested from a profiler server once or a plurality of times. Next, the modified page may be received from the profiler server a correspond number of times in response to requesting the modified page from the profiler server and time markers may be retrieve from the received modified page. The time markers may correspond to the inserted scripts. Then a profile may be rendered based upon the retrieved time markers and the rendered profile may be displayed.

18 Claims, 4 Drawing Sheets

120
PROFILER SERVER
100
110
140
BROWSER SERVER
NETWORK
130
PAGE SERVER

(56) References Cited

U.S. PATENT DOCUMENTS

| | | | | |
|---|---|---|---|---|
| 2010/0180158 | A1* | 7/2010 | Corry et al. | 714/38 |
| 2011/0010690 | A1* | 1/2011 | Howard et al. | 717/120 |
| 2011/0035375 | A1* | 2/2011 | Bekkerman | 707/734 |
| 2012/0023487 | A1* | 1/2012 | Letca et al. | 717/130 |

OTHER PUBLICATIONS

Firebug—Web Development Evolved, Published Date: Aug. 4, 2009 , http://getfirebug.com/.

HTTPWatch: Features, Published Date: Aug. 5, 2009, http://httpwatch.com/features.htm.

Web Page Analyzer—0.98—from Website Optimization, Published Date: Feb. 18, 2009, http://www.websiteoptimization.com/services/analyze/.

Truwex Web Page Check Tool Help, Published Date: May 4, 2007, http://www.erigami.com/truwex/help/profile-tab.html.

IEBlog: Introducing the IE8 Developer Tools JScript Profiler, Published Date: Sep. 11, 2008, http://blogs.msdn.com/ie/archive/2008/09/11/introducing-the-ie8-developer-tools-jscript-profiler.aspx.

* cited by examiner

PROFILER FOR PAGE RENDERING

BACKGROUND

In conventional systems, when assessing the time required to render a web page in a browser, it is difficult to break down which parts of the rendering process are the most costly with respect to time. For example, with a slow rendering page, the slowness could be caused by execution, application of styles, layout of page components, or other factors. With conventional systems, it is difficult to determine where to optimize.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Profiling may be provided. First, scripts may be inserted into a first page to create a modified page and the modified page may be requested from a profiler server once or a plurality of times. Next, the modified page may be received from the profiler server a correspond number of times in response to requesting the modified page from the profiler server and time markers may be retrieved from the received modified page. The time markers may correspond to the inserted scripts. Then a profile may be rendered based upon the retrieved time markers and the rendered profile may be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
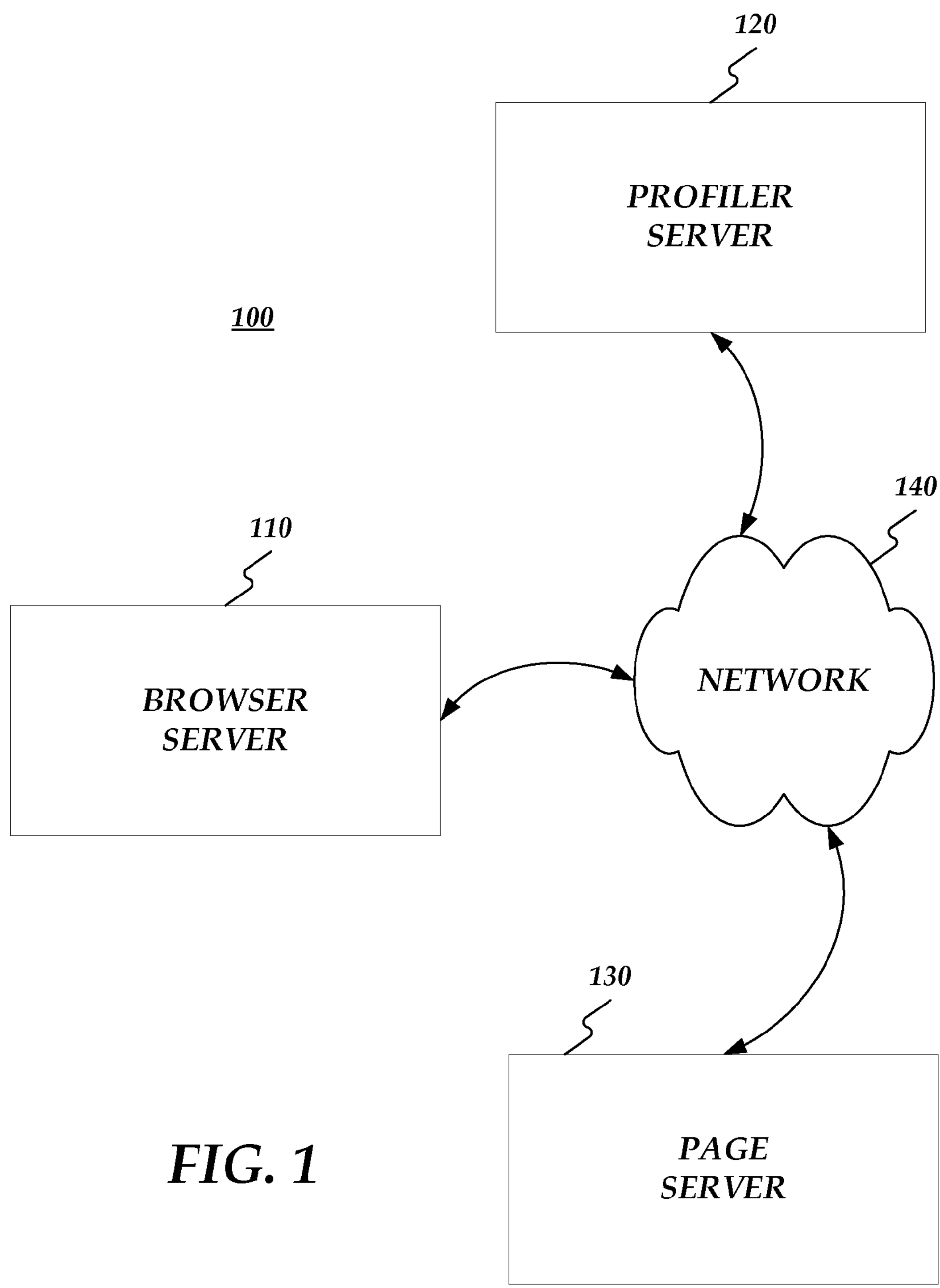
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

When assessing the time required to render a web page in a browser in conventional systems, it is difficult to break down which parts of the rendering process are the most costly with respect to time. For example, with a slow rendering page, the slowness could be caused by execution, application of styles, layout of page components, or other factors. Consistent with embodiments of the present invention, factors that are relevant at web page render time are brought into one unified analysis. For example, embodiments of the invention may load a web page in a browser, modify the web page with markers so that it can be profiled, then load the modified page, and store a profile generated from the markers in the modified page. The profile may then be displayed to a user hierarchically such that the user can analyze which parts of the page take the longest to render, as well as see the detailed breakdown of those parts.

FIG. 1 is a block diagram of an operating environment 100 consistent with embodiments of the invention. As shown in FIG. 1, environment 100 may comprise a browser server 110, a profiler server 120, a page server 130, and a network 140. Operating environment 100 may operate in accordance with a state diagram 200 illustrating a method for providing profiling as showed in FIG. 2. State diagram 200 is an example and other processes may be used to provide a profile. Browser server 110 may be implemented using, for example, a computing device 400 as described in greater detail below with respect to FIG. 4. Profiler server 120 and page server 130 may be implemented using other computing devices 418 also described in greater detail below with respect to FIG. 4. Network 140 may comprise, but is not limited to, the Internet. Notwithstanding, network 140 may comprise any network.

Figure 2:
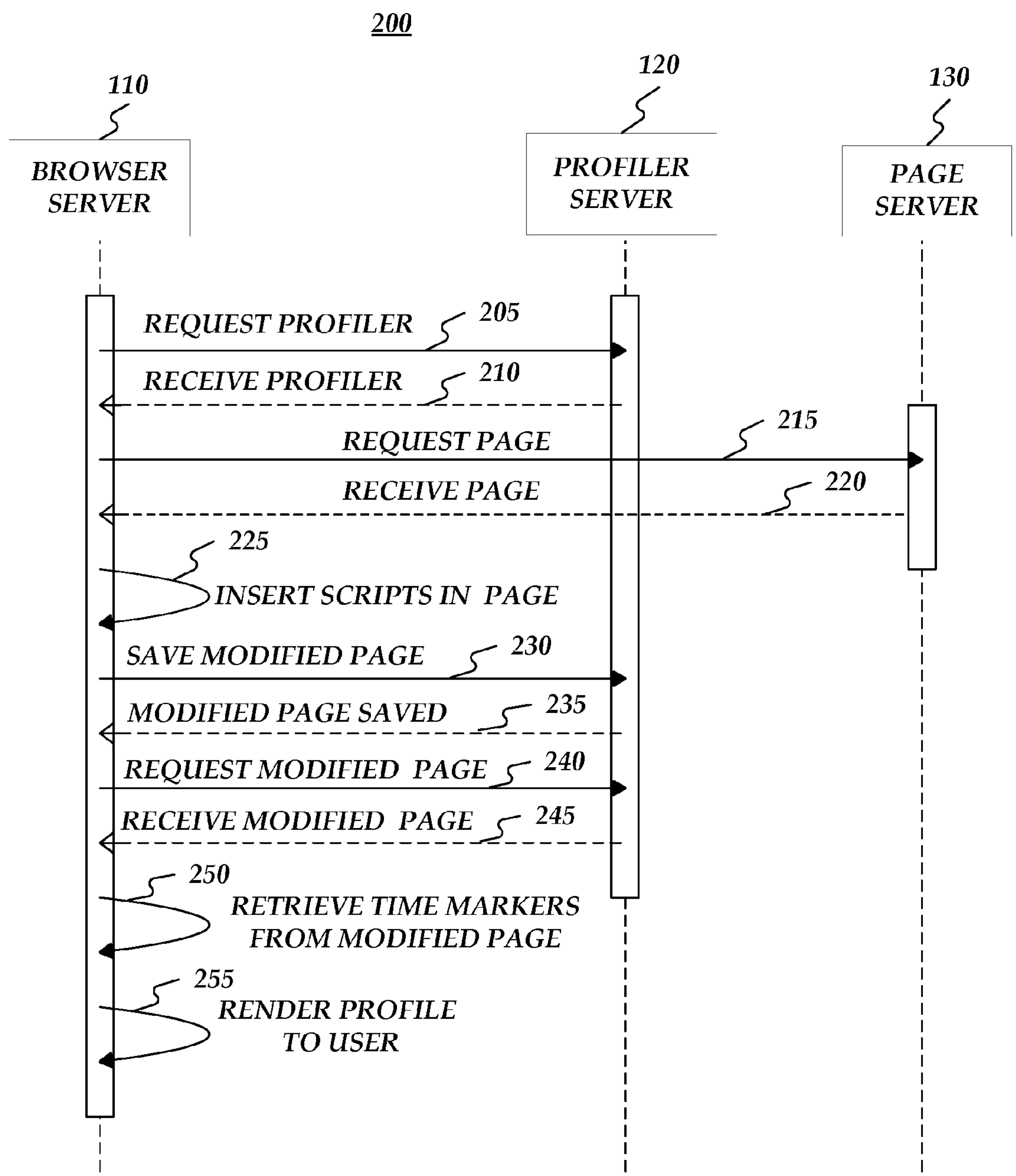
FIG. 2 is a state diagram of a method for providing profiling.

As showed in FIG. 2, consistent with embodiments of the invention, browser server 110, through a web browser, may request a profiler from profile server 120. (State 205.) The profiler may be copied into a web-accessible directory on profile server 120. The profiler may comprise, but is not limited to, a profiler application 420 as described in more detail below. In response to the request, browser server 110 may receive the profiler from profile server 120. (State 210.) Executing on browser server 110, the profiler may request (state 215) and receive (state 220) a page from page server 130. For example, the user may access the profiler via a web service and point it at the page on pager server 130. The page may comprise a page that tends to load slowly and for which a user wishes to determine why it tends to load slowly. The page may render slowly in the browser although the page may have been optimized to reduce network and server activity. The user may be unsure why the browser seems to add so much time to the page's rendering.

The profiler may then modify the page with scripts (e.g. markers or tags) so that the modified page can be profiled. (State 225.) In other words, the profiler may begin the process of generating a profile of the page. For example, the profiler may contain a "profiling frame" in which other web pages can be loaded. This frame may be instructed to load the page. The web browser, upon loading this page in the frame may create, for example, a document object model (DOM) representation of the page in the memory of browser server 110.

The profiler may take the DOM representation of the page and begin to analyze it. The goal may be to insert scripts throughout the page in such a way as to enable differentiation between when the scripts are executed and generate measurements that may indicate which scripts had large gaps between execution times. These script markers inserted by the profiler may function as trace tags that are executed when the modified page is rendered. The execution times of the executed script markers in the modified page may be saved in memory of browser server 110. A process for determining the script insertion is described in greater detail below with respect to method 300 in FIG. 3.

Next, the profiler executing on browser server 110 may then load and store the modified page on profiler server 120. (State 230.) Profiler server 120 may acknowledge that the modified page has been stored on profiler server 120. (State 235.) In other words, after inserting scripts into the DOM representation of the page as appropriate to make the modified page, the profiler may take the modified page and save it as a new web page to profiler server 120. In some cases, the modified page may refer to files from another server.

Now, the profiler executing on browser server 110 may instruct the profiling frame to load the modified page from profiler server 120. (State 240.) In response, browser server 110 may receive the modified page from profiler server 120. (State 245.) Depending on preference, the modified page may be loaded as little as one time or as many times as desired. Each time the modified page is loaded, the scripts inside the modified page may execute, and the times at which they execute may be stored in an array in memory on the page. The last script on the page may pass this array back to the parent frame, which may be the profiler itself. The profiler may then store this array for later use. In other embodiments, the parent could ask the "profile frame" for the array after it has signaled completion.

Next, the time markers may be retrieved from the modified page. (State 250.) For example, after the page has been loaded the requisite number of times, the profiler may have a collection of arrays, each of which may represent all the script execution times in one rendering of the page. From these arrays, the profiler may create the actual profiles. One example profile may be a sequential view of each script that executed and when it executed, or a view of the time elapsed between each set of consecutive script markers. Another example profile may be a hierarchical view of the page markup elements, and the time elapsed between executions of scripts that were inserted within those elements.

A hierarchical profile, for example, could show that the scripts around a <TABLE> element executed with a difference of 200 milliseconds, that its child <TR> elements had bounding script differences of 20 and 180 milliseconds respectively, and that the <TD> elements of the second <TR> had bounding script differences of 10, 10, 10, and 150 milliseconds. In a profile such as this, the user may know that the $4^{th}$ TD in the $2^{nd}$ TR of this table was what took the most time for the browser to render.

A profile may then be made by the profiler from the modified page on profiler server 120. The profile may then be displayed to a user hierarchically such that the user can analyze which parts of the page take the longest to render, as well as see the detailed breakdown of those parts. (State 255.) The profiler may take this profile in memory and display it to the user, who can expand or contract nodes of the profile in much the same way as a standard tree view. At some point, the user may find that a specific element constitutes a large portion of his page's overall rendering time. At that time, the user can click on a link associated with this element, and the element may be highlighted in the profile frame. Thus, the user may know visually which element on the page is so costly, as well as how long it takes and the name of the element in the markup.

Furthermore, the user may discover that the markup may be all very clean and that the browser spends most of the time parsing script files that are included as references. In any case, the user may have narrowed down how best to spend time improving page performance.

Figure 3:
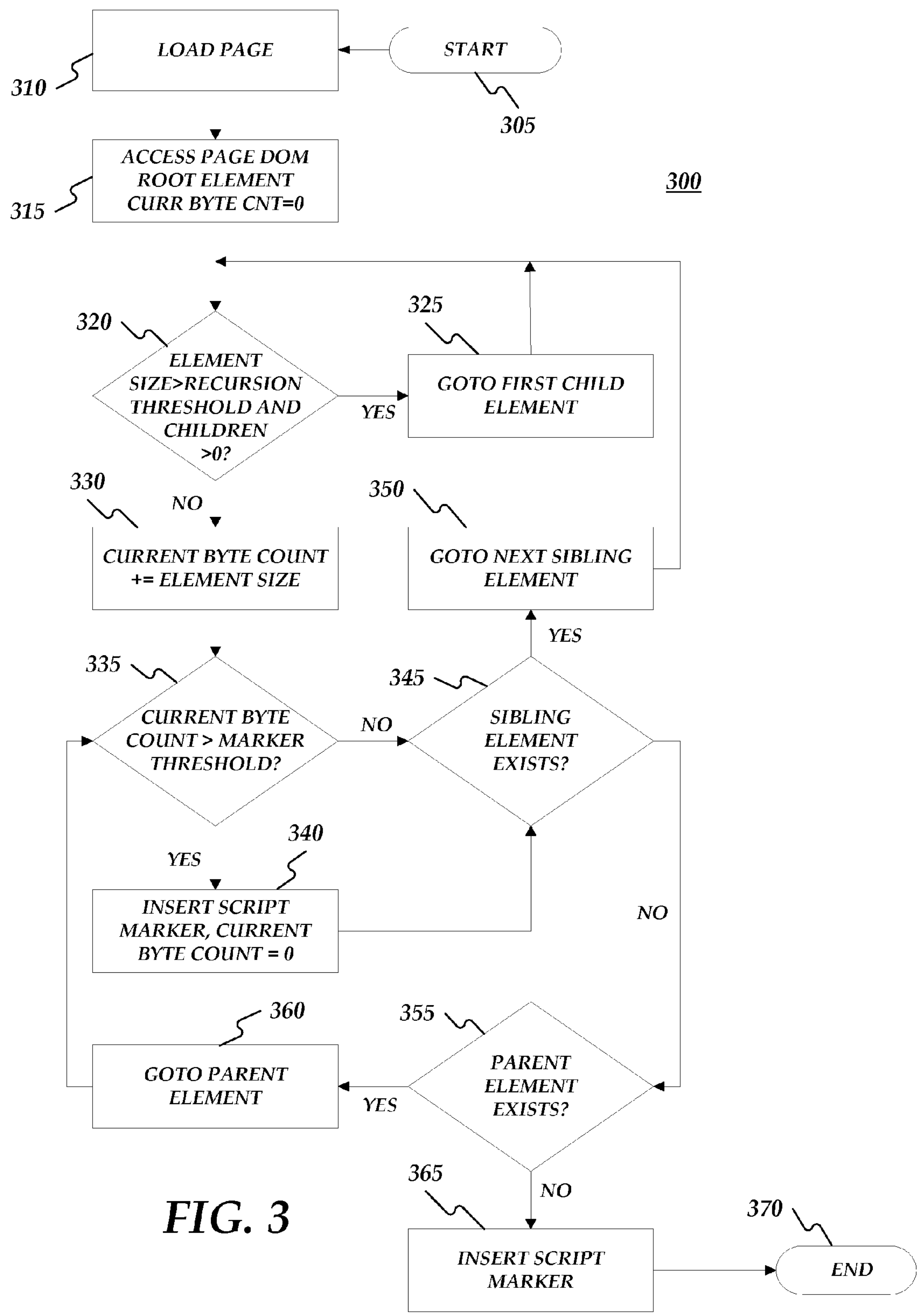
FIG. 3 is a flow chart of a method for inserting script.

While the profiler may parse the modified page, it may use a heuristic to decide where scripts should be inserted into the page. In some cases, it may be desirable to place scripts around the references to script files, Cascading Style Sheets (CSS) files, or images. In some cases, it may be desirable to place scripts inside the actual markup that may be visible to the user. In an example case, both of these scenarios may be desired. FIG. 3 is a flow chart setting forth the general stages involved in a method 300 consistent with embodiments of the invention illustrating an example heuristic for dynamic insertion of scripts into the page to create the modified page. Method 300 may be implemented by the profiler (e.g. profiler application 420) executing on computing device 400 as described in more detail below with respect to FIG. 4. Ways to implement the stages of method 300 will be described in greater detail below.

Method 300 may begin at starting block 305 and proceed to stage 310 where the profiler may load the modified page. The profiler may access the modified page DOM root element and set a current byte count to zero. (Stage 315.) Next, the profiler may determine if the element size is greater than a recursion threshold and if children are greater than zero. (Stage 320.) The example heuristic of method 300 may iterate through each level of the modified page DOM. In this example, if a given DOM element plus its children have a markup size greater than a certain "recursion threshold" (e.g. 1,000 bytes), the profiler may recursively examine each of the children of that element. (Stage 325.) Then, any time the profiler has parsed enough elements to surpass a "marking threshold" (e.g. 400 bytes), (stage 335) the profiler may insert script and resets the marking count to zero (stage 340). As illustrated in method 300, the process iterates through each level of the modified page DOM as long as sibling elements (stage 345) and parent elements (stage 355) exist. Consistent with embodiments of the invention, in another example heuristic, each element of the modified page DOM could have scripts inserted before and after it.

An embodiment consistent with the invention may comprise a system for providing profiling. The system may comprise a memory storage and a processing unit coupled to the memory storage. The processing unit may be operative to: i) request a profiler from a profiler server; ii) receive the profiler from the profiler server in response to the request for the profiler; iii) request a first page from a page server; iv) receive the first page from the page server in response to the request for the page; v) insert scripts into the first page to create a modified page; and vi) save the modified page to the profiler server. In addition, the processing unit may be operative to: i) receive confirmation from the profile server that the modified page has been saved by the profiler server; ii) request the modified page from the profiler server a plurality of times; iii) receive the modified page from the profiler server a correspond number of times in response to requesting the modified page from the profiler server the plurality of times; iv) retrieve time markers from the received modified page, the time markers corresponding the inserted scripts; v) render a profile based upon the retrieved time markers; and vi) display the rendered profile.

Another embodiment consistent with the invention may comprise a system for providing profiling. The system may comprise a memory storage and a processing unit coupled to the memory storage. The processing unit may be operative to insert scripts into a first page to create a modified page. The processing unit may be operative to insert the scripts configured to differentiate between when the scripts are executed and generate measurements that indicate which scripts had large gaps between execution times of the scripts. Furthermore, the processing unit may be operative to request the modified page from a profiler server a plurality of times and to receive the modified page from the profiler server a correspond number of times in response to requesting the modified page from the profiler server the plurality of times. Moreover, the processing unit may be operative to retrieve time markers from the received modified page, the time markers corresponding the inserted scripts, and to render a profile based upon the retrieved time markers.

Yet another embodiment consistent with the invention may comprise a system for providing profiling. The system may comprise a memory storage and a processing unit coupled to the memory storage. The processing unit may be operative to insert scripts into a first page to create a modified page and request the modified page from a profiler server a plurality of times. Furthermore, the processing unit may be operative to receive the modified page from the profiler server a corresponding number of times in response to requesting the modified page from the profiler server the plurality of times and to retrieve time markers from the received modified page. The time markers may correspond to the inserted scripts. Moreover, the processing unit may be operative to render a profile based upon the retrieved time markers and to display the rendered profile.

Figure 4:
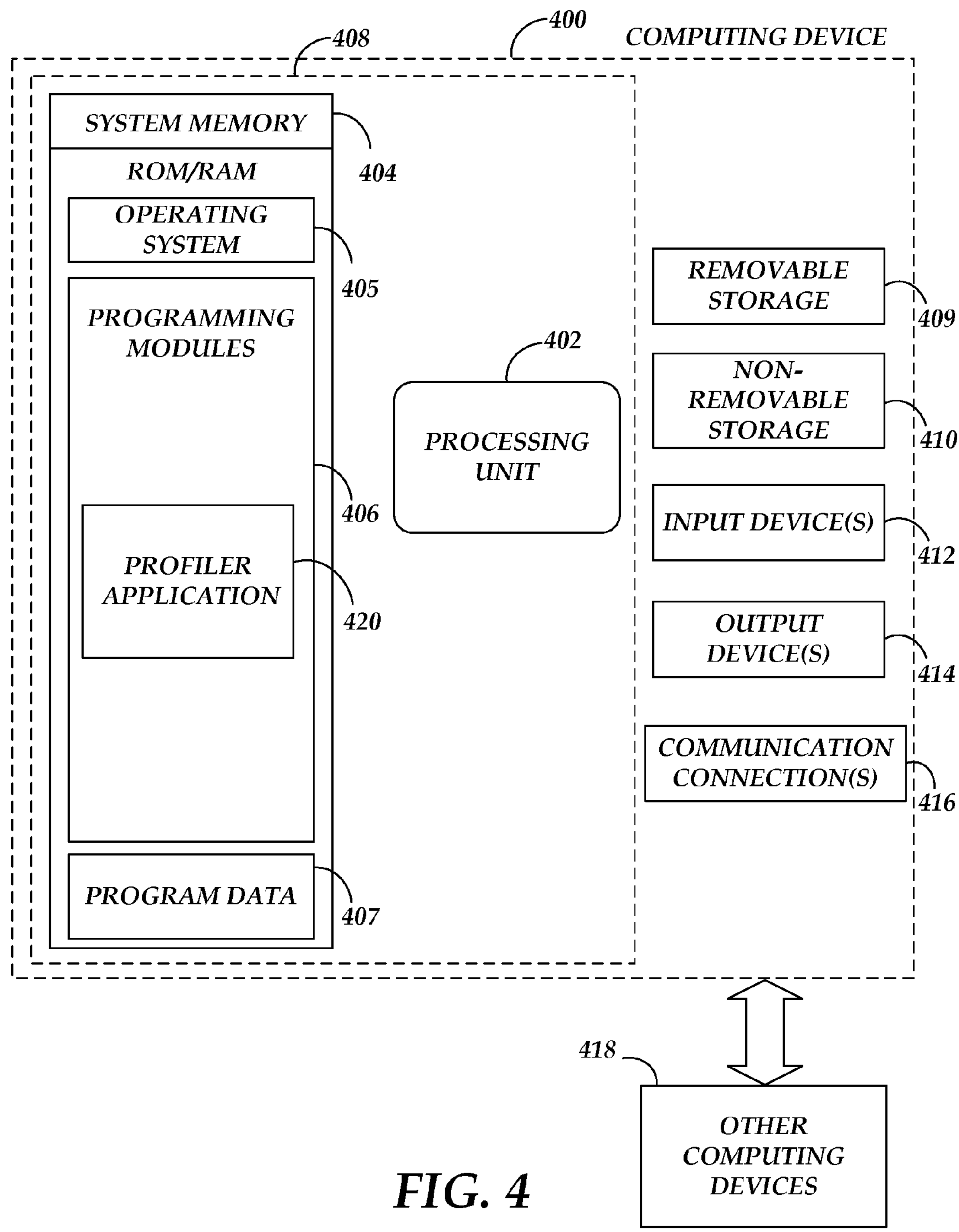
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for browser server 110 as described above. Browser server 110 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, profiler application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network (e.g. network 140) in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. profiler application 420) may perform processes including, for example, one or more of state diagram 200's states or one or more of method 300's stages as described above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing profiling, the method comprising:

requesting, by a browser server, a profiler from a profiler server;

receiving, by the browser server, the profiler from the profiler server in response to the request for the profiler;

requesting, by the profiler executing on the browser server, a first page from a page server;

receiving, by the profiler executing on the browser server, the first page from the page server in response to the request for the page;

determining, by the profiler executing on the browser server, that a Document Object Model (DOM) representation of a modified page has a markup size greater than a recursion threshold, wherein determining comprises:

iterating through the DOM representation comprising a plurality of root elements, and recursively examining associated child elements in each of the plurality of root elements to determine that the markup size is greater than the recursion threshold;

in response to determining that the DOM representation has the markup size greater than the recursion threshold, inserting, by the profiler executing on the browser server, scripts into the first page to create the modified page;

saving, by the profiler executing on the browser server, the modified page to the profiler server;

receiving, by the profiler executing on the browser server, confirmation from the profiler server that the modified page has been saved by the profiler server;

requesting, by the profiler executing on the browser server, the modified page from the profiler server a plurality of times;

receiving, by the profiler executing on the browser server, the modified page from the profiler server a corresponding number of times in response to requesting the modified page from the profiler server the plurality of times, wherein receiving the modified page from the profiler comprises executing the inserted scripts inside the modified page, and storing time markers into an array;

retrieving, by the profiler executing on the browser server, the time markers from the received modified page, wherein the time markers indicate when each inserted script has been executed;

rendering, by the profiler executing on the browser server, a profile based upon the retrieved time markers;

displaying, by the profiler executing on the browser server, the rendered profile; and reducing the time required to render the first page based on the rendered profile of the modified page.

2. The method of claim 1, wherein rendering the profile based upon the retrieved time markers comprises rendering based on an average of times for all the plurality of times.

3. The method of claim 1, wherein inserting the scripts into the first page to create the modified page comprises inserting the scripts configured to differentiate between when the scripts are executed and generate measurements that indicate which scripts had large gaps between execution times of the scripts.

4. The method of claim 1, wherein inserting the scripts into the first page to create the modified page comprises inserting the scripts wherein the scripts are configured to function as trace tags that are executed when the modified page is rendered.

5. The method of claim 1, wherein inserting the scripts into the first page to create the modified page comprises inserting the scripts into a document object model (DOM) representation of the first page to create the modified page.

6. The method of claim 1, wherein inserting the scripts into the first page to create the modified page comprises inserting the scripts around at least one of the following: references to script files, Cascading Style Sheets (CSS) files, and images.

7. The method of claim 1, wherein inserting the scripts into the first page to create the modified page comprises inserting the scripts inside a markup that is displayed to a user.

8. The method of claim 1, wherein determining, by the profiler executing on the browser server, that the Document Object Model (DOM) representation of the modified page has the markup size greater than the recursion threshold, wherein the recursion threshold comprises at least 1000 bytes.

9. The method of claim 1, wherein inserting the scripts into the first page to create the modified page comprises inserting the scripts when the profiler has parsed enough elements in the page to surpass a marking threshold.

10. The method of claim 1, wherein inserting the scripts into the first page to create the modified page comprises inserting the scripts when the profiler has parsed enough elements in the page to surpass the marking threshold comprising at least 400 bytes.

11. The method of claim 1, wherein inserting the scripts into the first page to create the modified page comprises inserting the scripts into a document object model (DOM) representation of the first page to create the modified page wherein a script is placed before and after each element in the document object model (DOM) representation of the first page.

12. The method of claim 1, wherein rendering the profile based upon the retrieved time markers comprises rendering the profile comprising a sequential view of each script that executed and when it executed.

13. The method of claim 1, wherein rendering the profile based upon the retrieved time markers comprises rendering the profile comprising a view of the time elapsed between each consecutive script execution.

14. The method of claim 1, wherein rendering the profile based upon the retrieved time markers comprises rendering the profile comprising a hierarchical view of the page and the time elapsed between execution of scripts that were inserted within the page.

15. A non-transitory computer-readable storage device that stores a set of instructions which when executed perform a method for providing profiling, the method executed by the set of instructions comprising:

requesting a first page from a page server;

determining that a Document Object Model (DOM) representation of a modified page has a markup size greater than a recursion threshold, wherein determining comprises:

iterating through the DOM representation comprising a plurality of root elements, and recursively examining associated child elements in each of the plurality of root elements to determine that the markup size is greater than the recursion threshold;

inserting scripts into the first page to create the modified page wherein inserting the scripts into the first page to create the modified page comprises inserting the scripts-configured to differentiate between when the scripts are executed and generate measurements that indicate which scripts had large gaps between execution times of the scripts;

requesting the modified page from a profiler server a plurality of times;

receiving the modified page from the profiler server a corresponding number of times in response to requesting the modified page from the profiler server the plurality of times, wherein receiving the modified page from the profiler server comprises executing the inserted scripts inside the modified page, and storing time markers into an array;

retrieving the time markers from the received modified page, wherein the time markers indicate when each inserted script has been executed;

rendering a profile based upon the retrieved time markers; and reducing the time required to render the first page based on the rendered profile of the modified page.

16. The non-transitory computer-readable storage device of claim 15, wherein rendering the profile based upon the retrieved time markers comprises rendering the profile comprising a sequential view of each script that executed and when it executed.

17. The non-transitory computer-readable storage device of claim 15, wherein rendering the profile based upon the retrieved time markers comprises rendering the profile comprising a view of the time elapsed between each consecutive script execution.

18. A system for providing profiling, the system comprising:

a memory storage; and a processing unit coupled to the memory storage, wherein the processing unit is operative to:

determine that a Document Object Model (DOM) representation of a modified page has a markup size greater than a recursion threshold, wherein determine comprises:

iterate through the DOM representation comprising a plurality of root elements, and recursively examine associated child elements in each of the plurality of root elements to determine that the markup size is greater than the recursion threshold;

insert scripts into the first page to create a modified page;

request the modified page from a profiler server a plurality of times;

receive the modified page from the profiler server a corresponding number of times in response to requesting the modified page from the profiler server the plurality of times, wherein receive the modified page from the profiler server comprises executing the inserted scripts inside the modified page, and storing time markers into an array;

retrieve the time markers from the received modified page, wherein the time markers indicate when each inserted script has been executed; render a profile based upon the retrieved time markers;

display the rendered profile; and reducing the time required to render the first page based on the rendered profile of the modified page.

* * * * *